United States Patent
Shiau et al.

(10) Patent No.: US 10,571,622 B2
(45) Date of Patent: Feb. 25, 2020

(54) LIGHT GUIDE PLATE AND BACKLIGHT MODULE

(71) Applicant: Coretronic Corporation, Hsin-Chu (TW)

(72) Inventors: Tzeng-Ke Shiau, Hsin-Chu (TW); Chao-Min Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/161,002

(22) Filed: Oct. 15, 2018

(65) Prior Publication Data

US 2019/0113673 A1    Apr. 18, 2019

(30) Foreign Application Priority Data

Oct. 17, 2017    (CN) ...................... 2017 2 1332658 U (51) Int. Cl.
*F21V 8/00* (2006.01)

(52) U.S. Cl.
CPC ......... *G02B 6/0061* (2013.01); *G02B 6/0036* (2013.01); *G02B 6/0038* (2013.01)

(58) Field of Classification Search
CPC ... G02B 6/0061; G02B 6/0036; G02B 6/0038
See application file for complete search history.

(56) References Cited

U.S. PATENT DOCUMENTS

| | | | | |
|---|---|---|---|---|
| 2008/0285309 A1* | 11/2008 | Fang | ..................... | G02B 6/0016 362/620 |
| 2009/0109703 A1* | 4/2009 | Chen | ..................... | G02B 6/0036 362/620 |
| 2011/0267694 A1* | 11/2011 | Shiau | ................... | G02B 6/0053 359/599 |
| 2012/0026429 A1* | 2/2012 | Chen | ....................... | G02B 6/004 349/65 |
| 2013/0163281 A1* | 6/2013 | Wang He | ............. | G02B 6/0031 362/611 |
| 2015/0055366 A1* | 2/2015 | Chang | .................. | G02B 6/0036 362/606 |
| 2017/0139097 A1* | 5/2017 | Robinson | ............... | G02B 6/002 |

FOREIGN PATENT DOCUMENTS

| | | |
|---|---|---|
| TW | I349121 B | 9/2011 |
| TW | I559040 B | 11/2016 |
| TW | I588553 B | 6/2017 |

\* cited by examiner

*Primary Examiner* — Donald L Raleigh (57) ABSTRACT

A light guide plate is provided in the invention. The light guide plate has a light incident surface, a bottom surface and a light exit surface. The bottom surface is opposite to the light exit surface. The light incident surface is connected between the bottom surface and the light exit surface. The light guide plate includes a plurality of light guide units and a plurality of microstructure units. The plurality of light guide units are convex to the bottom surface and arranged to be disposed along a direction parallel to the light incident surface. The plurality of light guide units is connected to each other on the light incident surface. The plurality of microstructure units are disposed corresponding to the plurality of light guide units respectively. Each of the microstructure units includes a plurality of microstructures. The invention further provides a backlight module having this light guide plate.

20 Claims, 11 Drawing Sheets

LIGHT GUIDE PLATE AND BACKLIGHT MODULE

CROSS-REFERENCE TO RELATED APPLICATION

THIS APPLICATION CLAIMS THE PRIORITY BENEFIT OF CHINA APPLICATION (CN201721332658.8 FILED ON 2017 Oct. 17). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a light guide element, and more particularly to a light guide plate and a backlight module having the light guide plate.

BACKGROUND OF THE INVENTION

Nowadays a liquid crystal display has been widely applied to various electronic devices that need a display. The liquid crystal display includes a liquid crystal display panel and a backlight module. Since the liquid crystal display panel itself does not emit light, it is necessary for the backlight module to provide a backlight to the liquid crystal display panel for displaying images. Therefore, the quality of the backlight provided by the backlight module also affects image quality.

The types of the backlight module include a direct type backlight module and a side-entry backlight module. The side-entry backlight module is widely used in thin electronic devices because it has the advantage of thinner thickness. The side-entry backlight module includes a light source and a light guide plate. The light guide plate is for transforming a light provided by the light source into the backlight. Therefore, the quality of the backlight is closely related to the structural design of the light guide plate.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light guide plate, so as to enhance the luminance of exit light.

The invention further provides a backlight module, so as to enhance the luminance of exit light.

Other objectives and advantages of the invention can be further understood from the technical features disclosed in the invention.

In order to achieve one or a portion of or all of the objectives or other objectives, the light guide plate of an embodiment of the invention has a light incident surface, a bottom surface and a light exit surface. The bottom surface is opposite to the light exit surface. The light incident surface is connected between the bottom surface and the light exit surface. The light guide plate includes a plurality of light guide units and a plurality of microstructure units. The light guide units are convex to the bottom surface and arranged to be disposed along a direction parallel to the light incident surface. The light guide units are connected to each other on the light incident surface and extended toward a predetermined direction away from the light incident surface. The microstructure units are disposed corresponding to the light guide units respectively. Each of the microstructure units includes a plurality of microstructures. The microstructures are arranged along the predetermined direction. Each of the microstructures has a light taking surface facing the light incident surface.

In order to achieve one or a portion of or all of the objectives or other objectives, the backlight module of an embodiment of the invention includes the light guide plate and a light source. The light source is disposed beside the light incident surface of the light guide plate.

The light guide unit and the microstructure are disposed on the bottom surface of the light guide plate of the invention. The microstructure has the light taking surface facing the light incident surface of the light guide plate. In addition the transmission path in which the light is guided by the light guide unit, the light can be emitted from the light exit surface of the light guide plate by the light taking surface of the microstructure so as to enhance the luminance at a main light exit angle.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
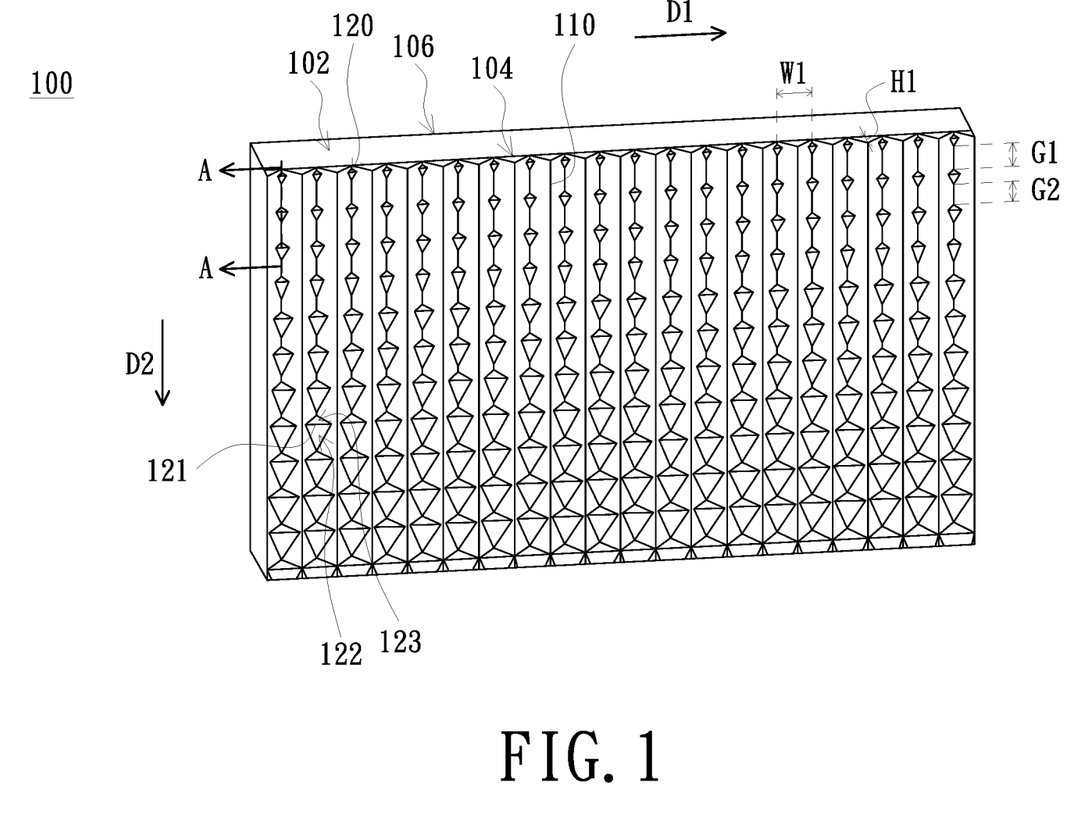
FIG. 1 is a schematic perspective view of a light guide plate of an embodiment of the invention.
Figure 2:
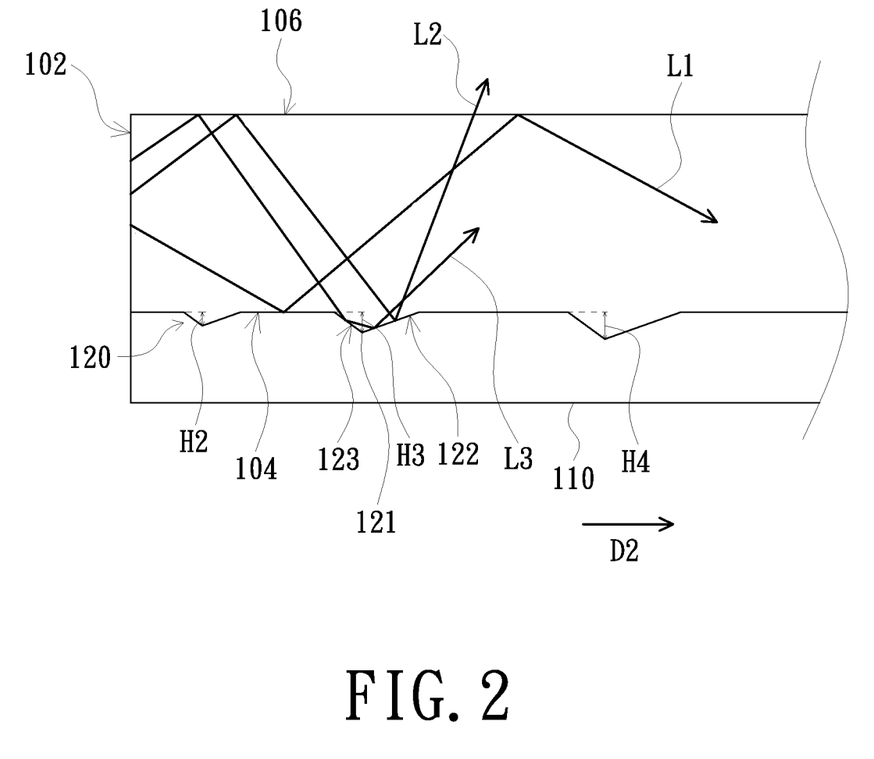
FIG. 2 is a schematic cross-sectional view taken along the line A-A in FIG. 1.

FIG. 1 is a schematic perspective view of a light guide plate of an embodiment of the invention. FIG. 2 is a schematic cross-sectional view taken along the line A-A in FIG. 1. Please refer to FIG. 1 and FIG. 2. The light guide plate 100 of the embodiment has a light incident surface 102, a bottom surface 104 and a light exit surface 106. The bottom surface 104 is opposite to the light exit surface 106. The light incident surface 102 is connected between the bottom surface 104 and the light exit surface 106. The light guide plate 100 includes a plurality of light guide units 110 and a plurality of microstructure units 120. The light guide units 110 are convex to the bottom surface 104 and disposed along a direction D1 parallel to the light incident surface 102. The light guide units 110 are connected to each other on the light incident surface 102 and extended toward a predetermined direction D2 away from the light incident surface 102. In the embodiment, the predetermined direction D2 is, for example, perpendicular to the light incident surface 102. The light guide unit 110 is, for example, a V-type cylinder, a semi-cylinder or a rectangular cylinder, etc. But the invention is not limited thereto. In addition, the microstructure units 120 are disposed corresponding to the light guide units 110 respectively. Each of the microstructure units 120 includes a plurality of microstructures 121. The plurality of microstructures 121 are arranged along the predetermined direction D2. Each of the microstructures 121 has a light taking surface 122 facing the light incident surface 102.

Each of the microstructure units 120 is, for example, respectively disposed between two adjacent light guide units 110. Each of the microstructures 121 is, for example, convex between two adjacent light guide units 110. In addition, each of the microstructures 121 further has, for example, a light adjusting surface 123 facing away from the light incident surface 102 and opposite to the light taking surface 122. A side of the light adjusting surface 123 is connected to a side of the light taking surface 122. The light adjusting surface 123 is located between the light incident surface 102 and the light taking surface 122.

In the same light guide unit 110, a width W1 and a height H1 of the light guide unit 110 are, for example, fixed values. That is, the width W1 and the height H1 of the light guide unit 110 are fixed from a side adjacent to the light incident surface 102 to a side away from the light incident surface 102. In addition, in the same microstructure unit 120, a height of the microstructure 121 further away from the light incident surface 102 is, for example, higher. Taking FIG. 2 as an example, the heights of the three microstructures 121 arranged in a direction from adjacent to the light incident surface 102 to away from the light incident surface 102 are H2, H3 and H4, respectively, and H4>H3>H2.

In the embodiment, the light incident from the light incident surface 102 is transmitted inside the light guide plate 100 approximately along the extending direction of the light guide unit 110 (i.e., the predetermined direction D2). Most of the lights transmitted inside the light guide plate 100 (such as lights L1, L2 and L3) result in one or more total reflections between the light exit surface 106, the bottom surface 104 and the microstructure unit 120. When the lights transmitted to the light taking surface 122 (such as the light L2) are reflected to the light exit surface 106 by the light taking surface 122, the lights are mostly emitted from the light exit surface 106 due to an incident angle is less than a critical angle. By a design of the light taking surface 122, an angle at which the light L2 is emitted from the light exit surface 106 can be controlled, so as to further enhance the luminance at a main light exit angle of the light guide plate 100. In addition, a light transmitted to the light adjusting surface 123 (such as the light L3) changes its transmission direction after being reflected by the light adjusting surface 123. Therefore, the light L3 can be effectively utilized by a design of an angle of the light adjusting surface 123, so as to enhance the luminance at the main light exit angle of the light guide plate 100. In addition, a size change, a change of spacing arrangement and the like of the microstructures 121 of the same microstructure unit 120 may be designed according to different requirements, so that a surface light source emitted from the light exit surface 106 has better uniformity.

For example, since the light from a light source (not illustrated) enters the light guide plate 100 from the light incident surface 102, a light energy received is stronger at a place closer to the light incident surface 102 inside the light guide plate 100. In order to avoid a situation where a bright area is formed because a light-emitting intensity is stronger at a place closer to the light incident surface 102 as compared to other places on the light exit surface 106, an area of the light taking surface 122 of the microstructure 121 that is further away from the light incident surface 102 may be designed to be greater. In addition, in the same microstructure unit 120, a spacing between two adjacent microstructures 121 that are closer to the light incident surface 102 may be designed to be greater (for example, in FIG. 1, spacing G1 is greater than spacing G2.).

Figure 3:
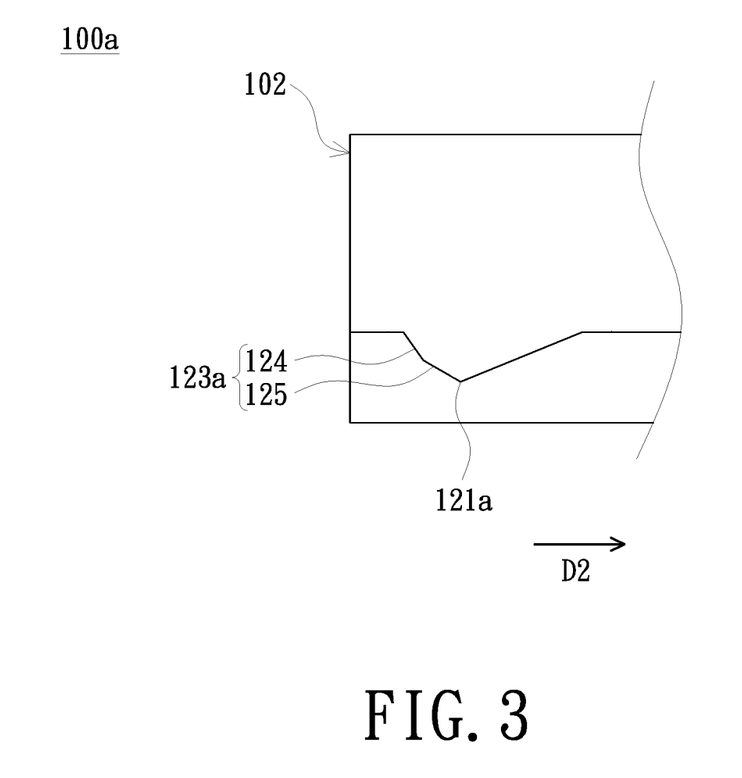
FIG. 3 is a partial schematic cross-sectional view of a light guide plate of an embodiment of the invention.

In the embodiment, the light adjusting surface 123 is, for example, a bevel surface, however, the light adjusting surface 123 may also be a curved surface or other different shapes and it may be adjusted according to design requirements. In a light guide plate 100a of another embodiment shown in FIG. 3, a light adjusting surface 123a of a microstructure 121a has, for example, a plurality of blocks 124 and 125 that are different in a slope. The blocks 124 and 125 are arranged along the predetermined direction D2. A slope of a block closer to the light incident surface 102 is greater. That is, a slope of the block 124 is greater than a slope of the block 125. In other embodiments, the number of the blocks may be more than two.

In addition, the light taking surface 122 of FIG. 2 is, for example, a bevel surface, however, the light taking surface 122 may also be a curved surface or other different shapes and it may be adjusted according to design requirements. In a light guide plate 100b of another embodiment shown in FIG. 4, a light taking surface 122b of a microstructure 121b may also be designed to have a plurality of blocks 126 and 127 that are different in a slope. The blocks 126 and 127 are arranged along the predetermined direction D2. A slope of a block closer to the light incident surface 102 is less. That is, a slope of the block 126 is less than a slope of the block 127. In other embodiments, the number of the blocks may be more than two. In addition, the light adjusting surface 123 of FIG. 4 may also be designed as the above-mentioned light adjusting surface having a plurality of blocks.

Figure 5:
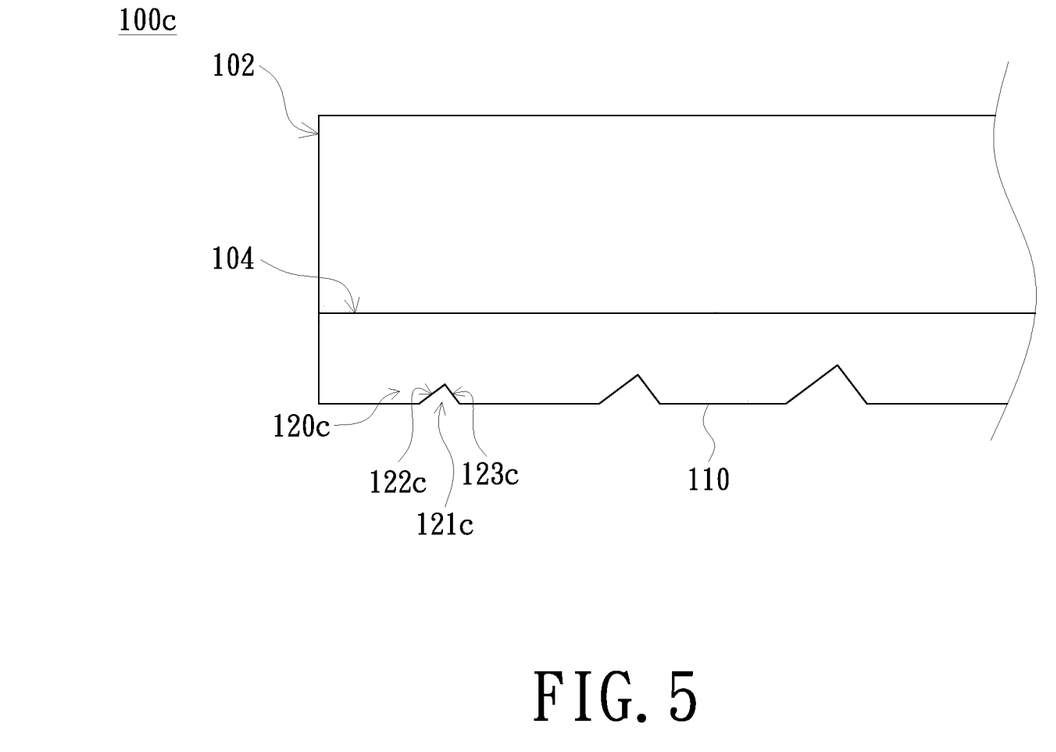
FIG. 5 is a partial schematic cross-sectional view of a light guide plate of another embodiment of the invention.

FIG. 5 is a partial schematic cross-sectional view of a light guide plate of another embodiment of the invention. Please refer to FIG. 5. A structure and advantages of a light guide plate 100c of the embodiment are similar to those of the light guide plate 100 described above. The following only describes structural differences. In the embodiment, the light guide unit 110 of the light guide plate 100c is disposed on the bottom surface 104. The microstructure units 120c (one in FIG. 5, for example) are correspondingly disposed at the light guide unit 110 respectively. Each microstructure 121c is concave to the corresponding light guide unit 110. Each of the microstructures 121c also has a light taking surface 122c facing the light incident surface 102 and a light adjusting surface 123c facing away from the light incident surface 102. The light taking surface 122c is located between the light incident surface 102 and the light adjusting surface 123c.

Figure 4:
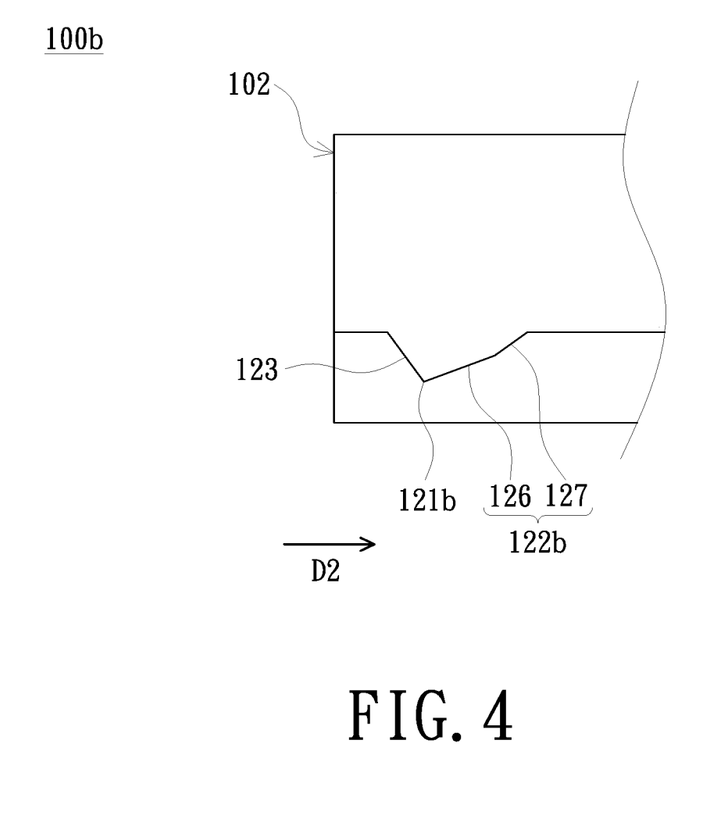
FIG. 4 is a partial schematic cross-sectional view of a light guide plate of another embodiment of the invention.

The light taking surface 122c is, for example, a bevel surface, however, the light taking surface 122c may also be designed as a curved surface or having a plurality of blocks with different slopes, similar to FIG. 4. The light adjusting surface 123c is, for example, a bevel surface, however, the light adjusting surface 123c may also be designed as a curved surface or having a plurality of blocks with different slopes, similar to FIG. 3.

Figure 6:
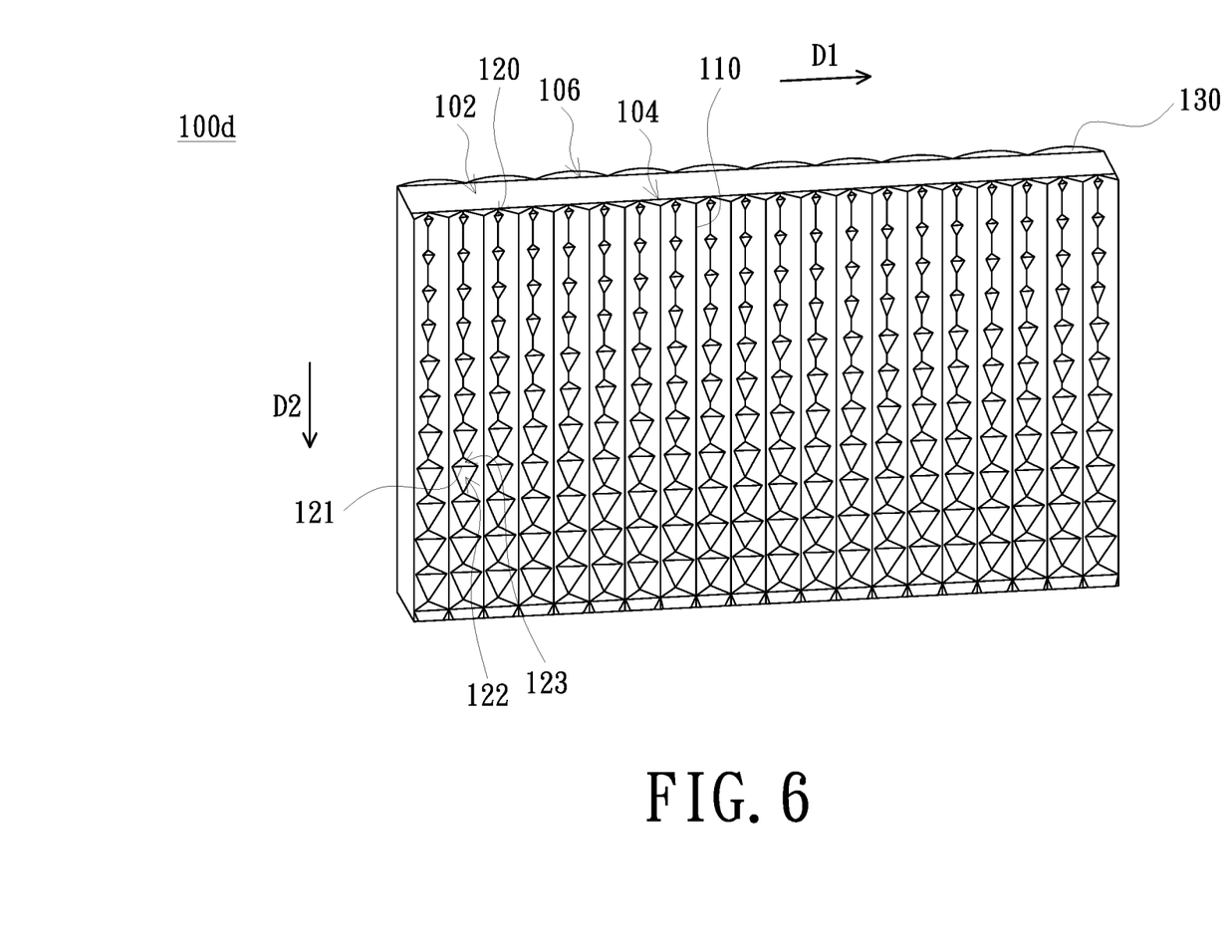
FIG. 6 is a schematic perspective view of a light guide plate of another embodiment of the invention.

FIG. 6 is a schematic perspective view of a light guide plate of another embodiment of the invention. Please refer to FIG. 6. A light guide plate 100d of the embodiment is similar to the light guide plate 100 of FIG. 1. The main difference is that the light exit surface 106 of the light guide plate 100d is provided with a plurality of semi-cylindrical bulges 130. Each of the semi-cylindrical bulges 130 is extended along the predetermined direction D2. The semi-cylindrical bulges 130 can be used for adjusting a main light exit angle. The semi-cylindrical bulges 130 may be disposed on the light exit surface of the light guide plate of any one of the embodiments of the invention. In other embodiments, the semi-cylindrical bulge 130 may also be replaced with convex structures of other shapes.

Figure 7:
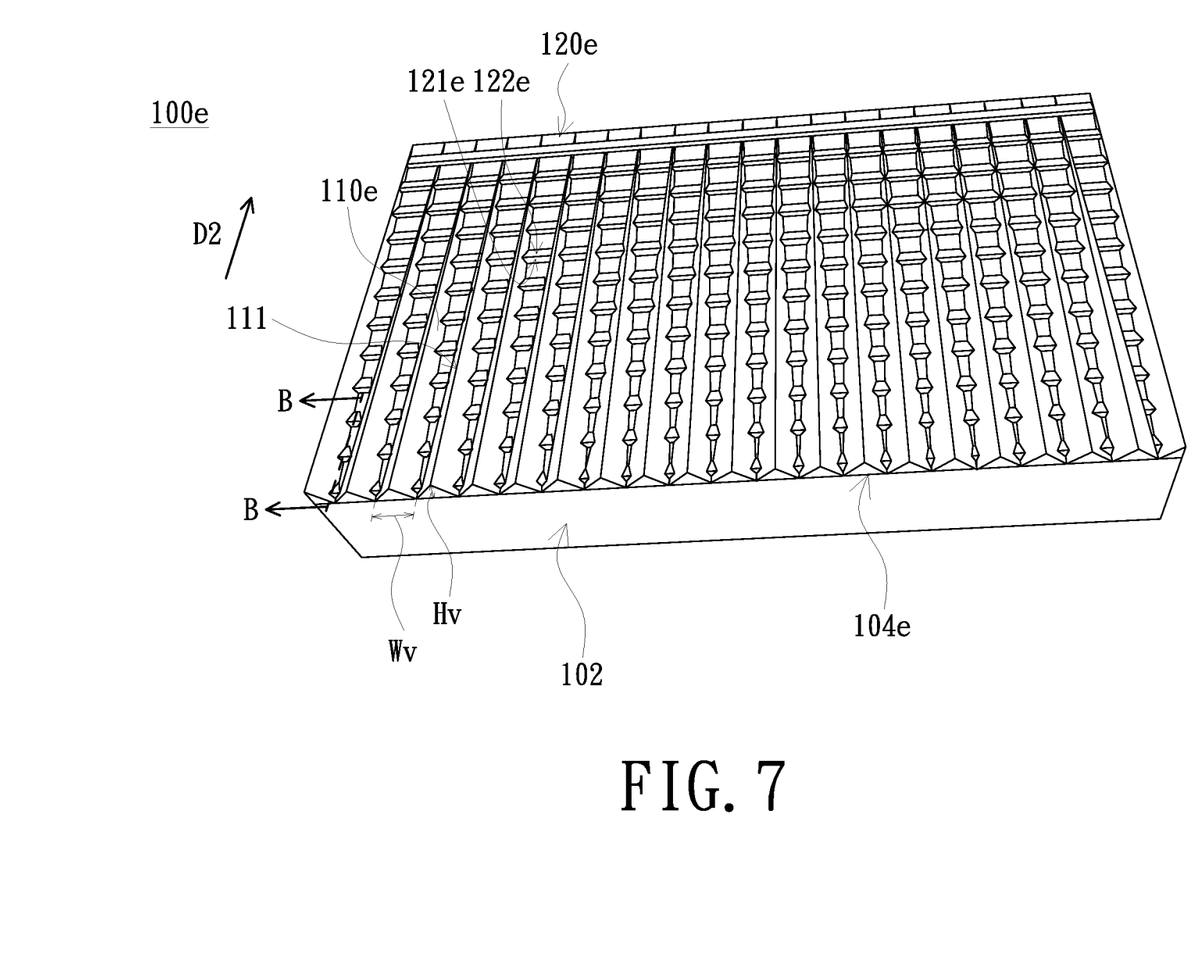
FIG. 7 is a schematic perspective view of a light guide plate of another embodiment of the invention.
Figure 8:
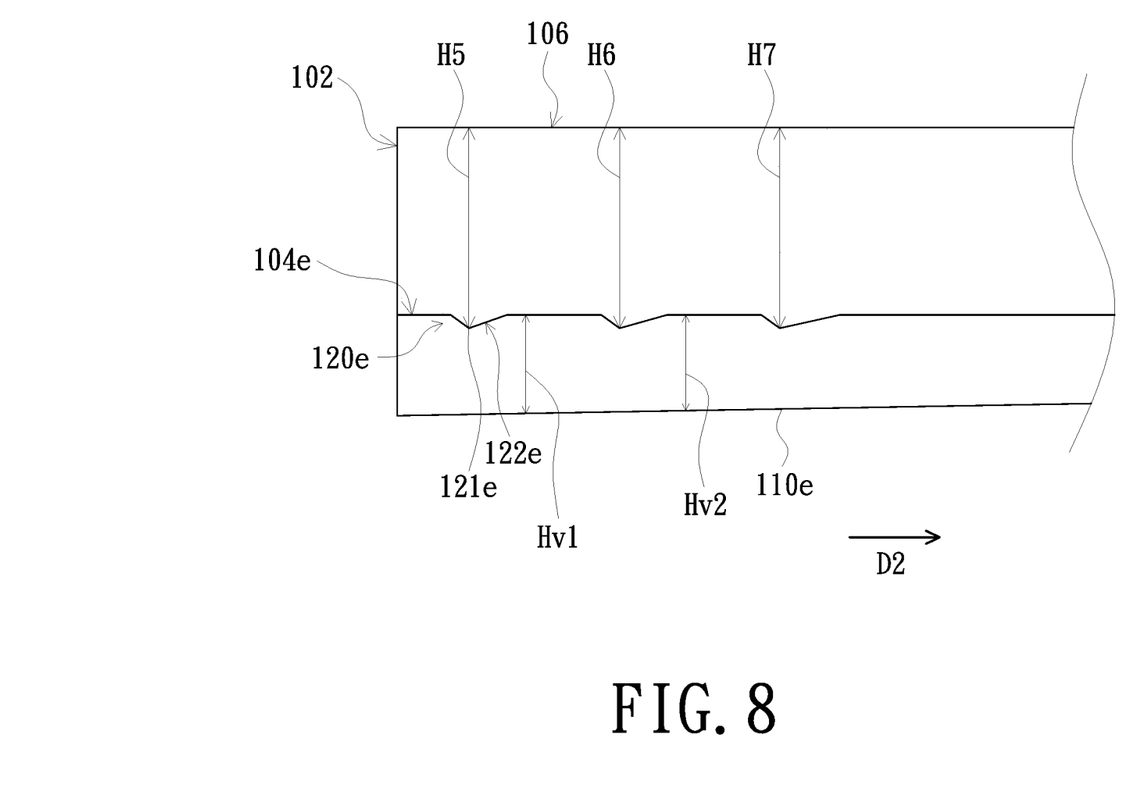
FIG. 8 is a schematic cross-sectional view taken along the line B-B in FIG. 7.

FIG. 7 is a schematic perspective view of a light guide plate of another embodiment of the invention. FIG. 8 is a schematic cross-sectional view taken along the line B-B of FIG. 7. Please refer to FIG. 7 and FIG. 8. A structure and advantages of a light guide plate 100e of the embodiment are similar to those of the light guide plate 100 described above. The following only describes structural differences. In the light guide plate 100e of the embodiment, in a same light guide unit 110e disposed on a bottom surface 104e, a width Wv of the light guide unit 110e gradually becomes narrower along the predetermined direction D2 away from the light incident surface 102, and a height Hv of the light guide unit 110e gradually becomes shorter along the predetermined direction D2. Taking FIG. 8 as an example, a height Hv1 of the light guide unit 110e is more adjacent to the light incident surface 102 of the light guide unit 110e is greater than a height Hv2 of the light guide unit 110e is further away from the light incident surface 102 of the light guide unit 110e. In addition, heights of microstructures 121e are the same in a same microstructure unit 120e. Taking FIG. 8 as an example, the heights of the three microstructures 121e arranged in a direction from near the light incident surface 102 to away from the light incident surface 102 are H5, H6 and H7, respectively. The heights H5, H6 and H7 of the three microstructures 121e are respectively a shortest distance between a tip of the microstructure 121e and the light exit surface 106, and H5=H6=H7. In the embodiment, the bottom surface 104e is a plane parallel to the light exit surface 106. In other embodiments, the bottom surface 104e may be, for example, a bevel surface inclined relative to the light exit surface 106. Top edges 111 of the plurality of light guide units 110e are, for example, located on a same plane. This plane is parallel to the light exit surface 106.

In the embodiment, a size change, a change of spacing arrangement and the like of the microstructures 121e of the same microstructure unit 120e may also be designed according to different requirements, so that the surface light source emitted from the light exit surface 106 has better uniformity. For example, since the light energy received is stronger at a place closer to the light incident surface 102 inside the light guide plate 100e, an area of a light taking surface 122e of the microstructure 121e that is further away from the light incident surface 102 may be designed to be greater in the same microstructure unit 120e. In addition, in the embodiment, a spacing between two adjacent microstructures 121e in the same microstructure unit 120e is, for example, equal.

Figure 9:
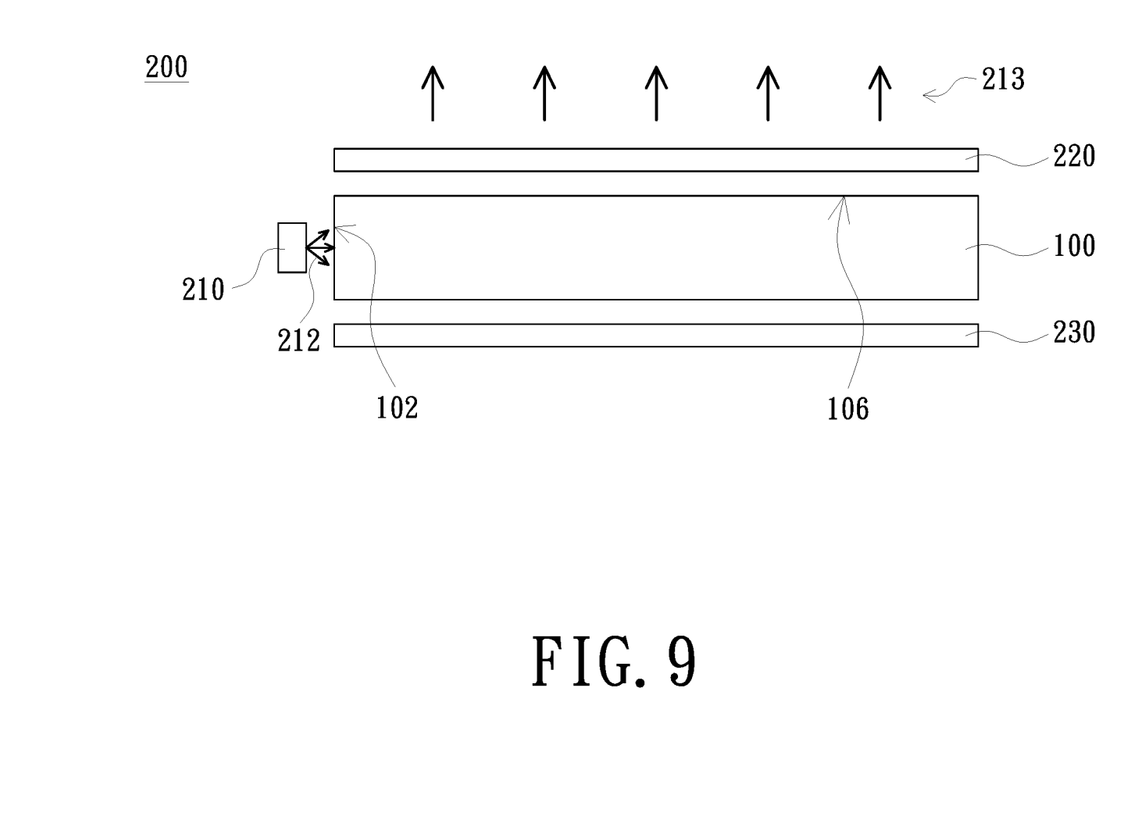
FIG. 9 is a schematic view of a backlight module of an embodiment of the invention.

FIG. 9 is a schematic view of a backlight module of an embodiment of the invention. Please refer to FIG. 9. The backlight module 200 of the embodiment includes the light guide plate 100 and a light source 210. The light source 210 is disposed beside the light incident surface 102 of the light guide plate 100. The light source 210 provides a light 212 that enters the light guide plate 100 through the light incident surface 102. The light guide plate 100 converts the light 212 into the surface light source 213 emitted from the light exit surface 106. As mentioned above, the light guide plate 100 adopted by the backlight module 200 of the embodiment can enhance the luminance at the main light exit angle of the light guide plate 100 and can configure the surface light source 213 emitted from the light exit surface 106 to have better uniformity. In addition, the light guide plate 100 of the embodiment may be replaced with the light guide plate of any one of other embodiments described above.

The backlight module 200 of the embodiment may further include an optical film 220, disposed above the light exit surface 106 so as to further homogenize the surface light source 213 or adjust a main light exit angle and so on. In addition, the backlight module 200 may further include a reflective sheet 230, disposed under the light guide plate 100 to reflect the light leaked from the light guide plate 100 back to the light guide plate 100 so as to improve light utilization efficiency.

Figure 10:
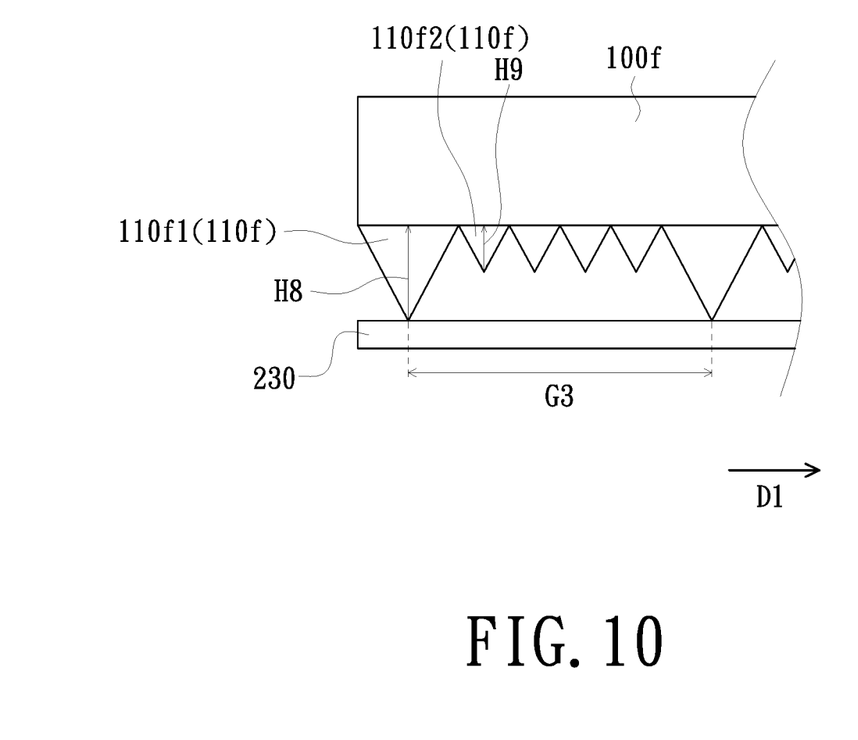
FIG. 10 is a schematic view of a light guide plate and a reflective sheet of another embodiment of the invention.

In another embodiment shown in FIG. 10, a light guide unit 110f of a light guide plate 100f, arranged and disposed along a direction D1 parallel to the light incident surface 102 (not shown in FIG. 10) may include a plurality of first light guide units 110f1 and a plurality of second light guide units 110f2. A height H8 of the first light guide unit 110f1 is higher than a height H9 of the second light guide unit 110f2. There are more than one second light guide units 110f2 between any two adjacent first light guide units 110f1. In FIG. 10, an example is shown that there are four second light guide units 110f2 between any two adjacent first light guide units 110f1. In an embodiment, a spacing G3 between any two adjacent first light guide units 110f1 is, for example, between 60 micrometers and 500 micrometers. A height difference (i.e., H8 minus H9) between each first light guide unit 110f1 and each second light guide unit 110f2 is, for example, between 1 micrometer and 20 micrometers.

In the embodiment, the reflective sheet 230 located under the light guide plate 100f only touches the first light guide unit 110f1 without touching the second light guide unit 110f2, thus a problem of a bright line, caused by the light guide unit 110f being in contact with the reflective sheet 230, can be reduced. In addition, a display panel itself, accompanied with the backlight module 200, may have a Moiré pattern defect. In the embodiment, the spacing G3 between any two adjacent first light guide units 110f1 can be designed according to a lightweave position of the Moiré pattern defect, to be staggered from the lightweave position of the Moiré pattern defect so as to prevent the Moiré pattern defect from being more obvious. The design of the first light guide unit 110f1 and the second light guide unit 110f2 having different heights according to the embodiment can be applied to the light guide plate of any one of the aforementioned embodiments.

Figure 11:
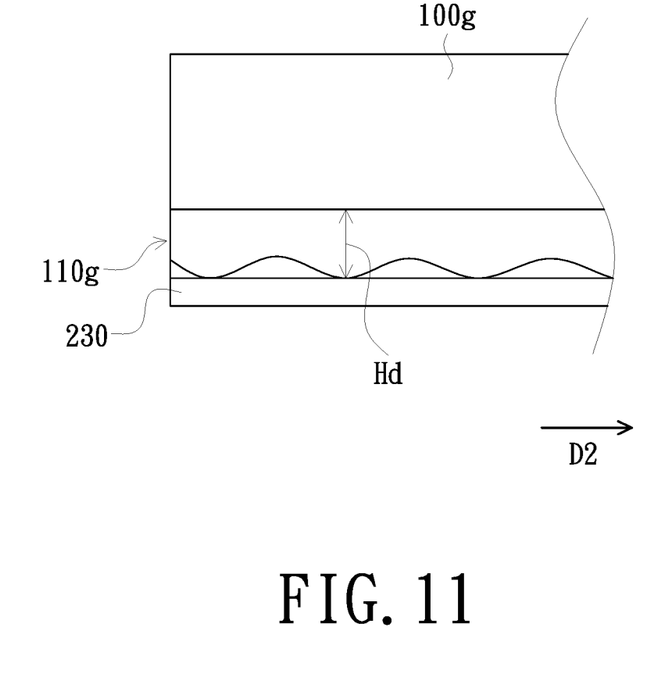
FIG. 11 is a schematic view of a light guide plate and a reflective sheet of another embodiment of the invention.

In another embodiment shown in FIG. 11, a height Hd of a same light guide unit 110g of a light guide plate 100g is fluctuated along the predetermined direction D2. In this way, a problem of a bright line, caused by the light guide unit 110g being in contact with the reflective sheet 230 can also be improved. The design that the height of the same light guide unit 110g is fluctuated according to the embodiment can be applied to the light guide plate of any one of the aforementioned embodiments.

In summary, the light guide unit and the microstructure are disposed on the bottom surface of the light guide plate of the invention. The microstructure has the light taking surface facing the light incident surface of the light guide plate. In addition that the transmission path of the light is guided by the light guide unit, the light can be configured to be emitted from the light exit surface of the light guide plate by the light taking surface of the microstructure, so as to enhance the luminance at the main light exit angle. In addition, the size change, the change of spacing arrangement and the like of the plurality of microstructures of the same microstructure unit may be designed according to different requirements, so that the surface light source emitted from the light exit surface has better uniformity.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first light guide unit and the second light guide unit are only used for distinguishing various elements and do not limit the number of the elements.

What is claimed is:

1. A light guide plate, having a light incident surface, a bottom surface and a light exit surface, wherein the bottom surface is opposite to the light exit surface, the light incident surface is connected between the bottom surface and the light exit surface, and the light guide plate comprises:
   a plurality of light guide units, convex to the bottom surface and disposed along a direction parallel to the light incident surface, wherein the light guide units are connected to each other on the light incident surface and extended toward a predetermined direction away from the light incident surface; and
   a plurality of microstructure units, disposed corresponding to the light guide units respectively, wherein each of the microstructure units comprises a plurality of microstructures, the microstructures are arranged along the predetermined direction, and each of the microstructures has a light taking surface facing the light incident surface.

2. The light guide plate according to claim 1, wherein each of the microstructure units is respectively disposed between two adjacent light guide units and each of the microstructures is convex between two adjacent light guide units.

3. The light guide plate according to claim 2, wherein in the same light guide unit, a width and a height of the light guide unit are fixed values.

4. The light guide plate according to claim 3, wherein in the same microstructure unit, a height of the microstructure further away from the light incident surface is higher.

5. The light guide plate according to claim 3, wherein in the same microstructure unit, an area of the light taking surface of the microstructure further away from the light incident surface is greater.

6. The light guide plate according to claim 3, wherein in the same microstructure unit, a spacing between two adjacent microstructures closer to the light incident surface is greater.

7. The light guide plate according to claim 2, wherein in the same light guide unit, a width of the light guide unit is gradually narrower along the predetermined direction, and a height of the light guide unit is gradually shorter along the predetermined direction.

8. The light guide plate according to claim 7, wherein in the same microstructure unit, the heights of the microstructures are the same.

9. The light guide plate according to claim 7, wherein in the same microstructure unit, an area of the light taking surface of the microstructure further away from the light incident surface is greater.

10. The light guide plate according to claim 7, wherein in the same microstructure unit, a spacing between two adjacent microstructures is equal.

11. The light guide plate according to claim 1, wherein the light guide units comprise a plurality of first light guide units and a plurality of second light guide units, a height of the first light guide units is higher than a height of the second light guide units, and there are more than one of the second light guide units between any two adjacent first light guide units.

12. The light guide plate according to claim 11, wherein a spacing between any two adjacent first light guide units is between 60 micrometers and 500 micrometers, and a height difference between each of the first light guide units and each of the second light guide units is between 1 micrometer and 20 micrometers.

13. The light guide plate according to claim 1, wherein a height of the same light guide unit is fluctuated along the predetermined direction.

14. The light guide plate according to claim 1, wherein the microstructure units are correspondingly disposed at the light guide units respectively, and each of the microstructures is concave to the corresponding light guide unit.

15. The light guide plate according to claim 1, wherein each of the microstructures further has a light adjusting surface facing away from the light incident surface and opposite to the light taking surface, and a side of the light adjusting surface is connected to a side of the light taking surface.

16. The light guide plate according to claim 15, wherein the light adjusting surface has a plurality of blocks different in a slope, the blocks are arranged along the predetermined direction, and a slope of the block further closer to the light incident surface is greater.

17. The light guide plate according to claim 1, wherein the light taking surface has a plurality of blocks different in a slope, the blocks are arranged along the predetermined direction, and a slope of the block further closer to the light incident surface is less.

18. The light guide plate according to claim 1, wherein the predetermined direction is perpendicular to the light incident surface.

19. The light guide plate according to claim 1, wherein the light exit surface is provided with a plurality of semi-cylindrical bulges and each of the semi-cylindrical bulges is extended along the predetermined direction.

20. A backlight module, comprising:
the light guide plate according to claim 1; and
a light source, disposed beside the light incident surface of the light guide plate.

\* \* \* \* \*